(12) United States Patent
Bousquet et al.

(10) Patent No.: US 7,603,344 B2
(45) Date of Patent: Oct. 13, 2009

(54) METHODS FOR SEARCHING FORENSIC DATA

(75) Inventors: Raphael Bousquet, Washington, DC (US); Jai Jit Singh Wallia, Washington, DC (US)

(73) Assignee: Advanced Digital Forensic Solutions, Inc., Bethesda, MD (US)

( * ) Notice: Subject to any disclaimer, the term of this patent is extended or adjusted under 35 U.S.C. 154(b) by 198 days.

(21) Appl. No.: 11/318,084

(22) Filed: Dec. 23, 2005

(65) Prior Publication Data

US 2007/0085710 A1    Apr. 19, 2007

Related U.S. Application Data

(60) Provisional application No. 60/728,208, filed on Oct. 19, 2005.

(51) Int. Cl.
*G06F 17/30*    (2006.01)
(52) U.S. Cl. .............................. 707/3; 707/102; 713/179
(58) Field of Classification Search ...................... 707/3
See application file for complete search history.

(56) References Cited

U.S. PATENT DOCUMENTS

| | | | | |
|---|---|---|---|---|
| 6,085,976 | A * | 7/2000 | Sehr | 235/384 |
| 6,532,459 | B1 * | 3/2003 | Berson | 707/3 |
| 6,538,623 | B1 | 3/2003 | Parnian et al. | |
| 6,792,545 | B2 * | 9/2004 | McCreight et al. | 726/29 |
| 6,973,449 | B2 | 12/2005 | Meltzer | |
| 2002/0085718 | A1 * | 7/2002 | Rhoads | 380/234 |
| 2003/0070076 | A1 * | 4/2003 | Michael | 713/182 |
| 2003/0084279 | A1 | 5/2003 | Campagna | |
| 2003/0115147 | A1 | 6/2003 | Feldman et al. | |
| 2004/0225894 | A1 | 11/2004 | Colvin et al. | |
| 2005/0022014 | A1 | 1/2005 | Shipman | |

(Continued)

OTHER PUBLICATIONS

Author: Cmdr. Dave Pettinari Title: EnCase Forensic Evidence Acquision and Analysis Date: Jun. 2, 2000 Publisher: Pueblo County Sheriff's Office Pertinent Pages: whole document (pp. 1-12).*

(Continued)

*Primary Examiner*—Tim T. Vo
*Assistant Examiner*—Anh Tai V Tran
(74) *Attorney, Agent, or Firm*—Miles & Stockbridge, P.C.; Eric G. King

(57) ABSTRACT

A digital forensic search tool which enables a first entity, such as a federal investigation agency, to share its suspect and sensitive data with a second entity, such as another investigative agency, in a manner that allows the second agency to utilize the suspect data while not revealing the actual content of the sensitive data to the second agency. The second agency can perform comparisons and other operations on the sensitive data without having to know the actual content of the data. The search tool allows an investigative agency to define an investigative strategy for a particular case via the search markup language programs and by the data features that it includes in the search tool. Thus, by sharing search tools among agencies, an agency can share or inform others of that agency's theory of the case and investigative goal.

23 Claims, 5 Drawing Sheets

U.S. PATENT DOCUMENTS

2005/0183143 A1* 8/2005 Anderholm et al. ........... 726/22
2007/0085711 A1   4/2007 Bousquet et al.
2007/0139231 A1   6/2007 Wallia et al.

OTHER PUBLICATIONS

"A Taxonomy of Data Grids for Distributed Data Sharing, Management and Processing", Venugopal et al., ACM Computing Surveys, vol. 38, Issue 1, Article No. 3, Jun. 2006, and citation establishing date of publication.

International Search Report and Written Opinion received in PCT/US06/48651.

* cited by examiner

METHODS FOR SEARCHING FORENSIC DATA

CROSS-REFERENCE TO RELATED APPLICATIONS

This application claims priority under 35 U.S.C. §119 to U.S. Provisional Application 60/728,208, titled "Systems and Methods for Enterprise-Wide Forensic Data Sharing and Management" filed by Oct. 19, 2005 and is related to concurrently filed U.S. Utility Patent Application titled "Systems and Methods for Enterprise-Wide Identification Data Sharing and Management", assigned to Advanced Digital Forensics, Inc. Both applications are incorporated herein for all purposes.

BACKGROUND OF THE INVENTION

1. Field of the Invention

The present invention relates generally to computer software applications for data management. Specifically, it relates to systems and methods of digital data identification and the storage, management, and processing of digital evidence in computer systems.

2. Introduction

An increasing number of criminal and terrorist acts and preparations leading to such acts are leaving behind evidence in digital formats sometimes referred to as a "digital fingerprint". The field of collecting and analyzing these types of data is called digital data identification. These digital formats vary widely and include typical computer files, digital videos, e-mail, instant messages, phone records, and so on. They are routinely gathered from seized hard drives, "crawled" Internet data, mobile digital devices, digital cameras, and numerous other digital sources that are growing steadily in sophistication and capacity. When accurately and timely identified by law enforcement agencies, digital evidence can provide the invaluable proof that clinches a case.

The United States Federal Bureau of Investigation (FBI) has indicated that digital evidence has spread from a few types of investigations, such as hacking and child pornography, to virtually every investigative classification, including fraud, extortion, homicide, identity theft, and so on.

The amount of evidence that exists in digital form is growing rapidly. This growth is demonstrated by the following information which was presented by the FBI at the 14th INTERPOL Forensic Science Symposium. The Computer Analysis Response Team (CART) is the FBI's computer forensic unit and is primarily responsible for conducting forensic examinations of all types of digital hardware and media. For example, according to FBI CART, the number of FBI cases has tripled from 1999 to 2003. This is the result of the increased presence of digital devices at crime scenes combined with a heightened awareness of digital evidence by investigators.

While the number of cases increased threefold from 1999 to 2003, the volume of data increased by forty-six times during the same period. Given the declining prices of digital storage media and the corresponding increases in sales of storage devices, the volume of digital information that investigators must deal with is likely to continue its meteoric increase.

This tremendous increase in data presents a number of problems for law enforcement. Traditionally, law enforcement seizes all storage media, creates a drive image or duplicates it, and then conducts their examination of the data on the drive image or duplicate copy to preserve the original evidence. A "drive image" is an exact replica of the contents of a storage device, such as a hard disk stored on a second storage device, such as a network server or another hard disk. One of the first steps in the examination process is to recover latent data such as deleted files, hidden data and fragments from unallocated file space. This process is called data recovery and requires processing every byte of any given piece of media. If this methodology continues, the number of pieces of digital media with their increasing size will push budgets, processing capability and physical storage space to their limits. Compounding these problems are legal requirements, for example, of providing a defendant in a criminal trial with a copy of the data and retaining the data for the length of the defendant's sentence.

The delay in identifying suspect data occasionally results in the dismissal of some criminal cases where the evidence is not being produced in time for prosecution. Present solutions are efficient for data recovery, but still require manual review from examiners to identify specific data needed to prove guilt or innocence. None of the solutions today provide technologies or methodologies for identifying conclusive digital evidence automatically. Conclusive digital evidence is any digital evidence that can automatically either prove guilt e.g. images of known child pornography, or indicate probable guilt e.g. images of currency plates, driver's licenses, or terrorist training camps that require authentication and/or further review to determine criminal activity. In an effort to reduce the volume of digital files for review, seized digital evidence is processed to reduce the amount of this data. These processes are called "data reduction" by forensic examiners.

A method currently used for data reduction involves performing a hash analysis against digital evidence. A cryptographic one-way hash (or "hash" for short) is essentially a digital fingerprint: a very large number that uniquely identifies the content of a digital file. A hash is uniquely determined by the contents of a file. Therefore, two files with different names but the exact same contents will produce the same hash.

The National Institute of Standards and Technology (NIST) produces a set of hash sets called the National Software Reference Library that contains hashes for approximately 7 million files as of 2004 (www.nsrl.nist.gov).

Files in a hash set typically fall into one of two categories. Known files are known to be "OK" and can typically be ignored, such as system files such as win.exe, explore.exe, etc. Suspect files are suspicious files that are flagged for further scrutiny; files that have been identified as illegal or inappropriate, such as hacking tools, encryption tools and so on.

A hash analysis automates the process of distinguishing between files that can be ignored while identifying the files known to be of possible evidentiary value. Once the known files have been identified then these files can be filtered. Filtering out the known files may reduce the number of files the investigator must evaluate.

Using hash systems to identify conclusive or known suspect files face several challenges. They cannot be used to identify multimedia files (image, video, and sound) that have been altered, whether minimally or substantially. As a consequence an individual using these files to commit crimes escape prosecution.

In addition some law enforcement and intelligence agencies maintain disparate digital fingerprint hash sets, but no such agency currently has a system to create, catalog, and maintain its suspect data files. Although agencies are aware of the known suspect data or files, they do not have a comprehensive management system to catalog and maintain these data.

Digital forensic analysis tools used today are standalone systems that are not coordinated with systems used by the agency analysts and information technology (IT) staff. Agencies do not share information at an optimal level. This has become increasingly important since the terrorists attacks of Sep. 11, 2001, which created a strong demand for greater information sharing between law enforcement agencies. A primary reason this has not been achieved is that there are security risks associated with sharing classified data.

It would be beneficial and desirable to integrate newer, advanced hash technologies to automate the detection and classification process for suspect files and identify altered files. This would allow law enforcement to focus on identifying conclusive data during the forensic process and addresses many of the problems facing digital forensic examinations today. It would also be desirable to enable agencies to manage and share key suspect files and to use a common language to define an investigative strategy and data search.

SUMMARY OF THE INVENTION

In one aspect of the present invention, a software component for conducting digital forensic searches is described. The software component has a header; one or more search markup language programs, and a data features section containing features of data. The software component, also referred to as a search pack, enables a first entity, such as a federal investigation agency to share its suspect and sensitive data with a second entity, such as another investigative agency in a manner that allows the second agency to utilize the suspect data while not revealing the actual content of the sensitive data to the second agency. The second agency can perform comparisons and other operations on the sensitive data without having to know the actual content of the data. The search pack of the present invention allows an investigative agency to define an investigative strategy for a particular case via the search markup language programs and by the data features that it includes in the search pack. Thus, by sharing search packs among agencies, an agency can share or inform others of that agency's theory of the case and investigative goal. Search packs can also be updated automatically as new information is learned about a particular case. However, how the search pack is updated is determined by the agency that created it and manages it.

In one embodiment, a search pack also contains a data verification section that contains some form of actual data representations of the sensitive data, such as thumbnail images or series of images in case of video, whereby a second agency, for example, can verify identification of potential suspect data that have been previously identified. In another embodiment, the features data in the search pack cannot be directly modified by any party other than the party that created the search pack.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PRESENT INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The system in which the present invention is implemented includes a platform and an application which are subjects of co-pending application entitled "Systems and Methods for Enterprise-Wide Identification Data Sharing and Management" and incorporated herein for all purpose. The present invention includes tools for searching and performing other operations on forensic data, referred to as search packs and search markup language, SML. These inventions operate within digital forensic and data identification applications and platforms. Before describing the concept and implementation details of search packs and SML, it is helpful to describe the application and platform in which they operate.

Figure 1:
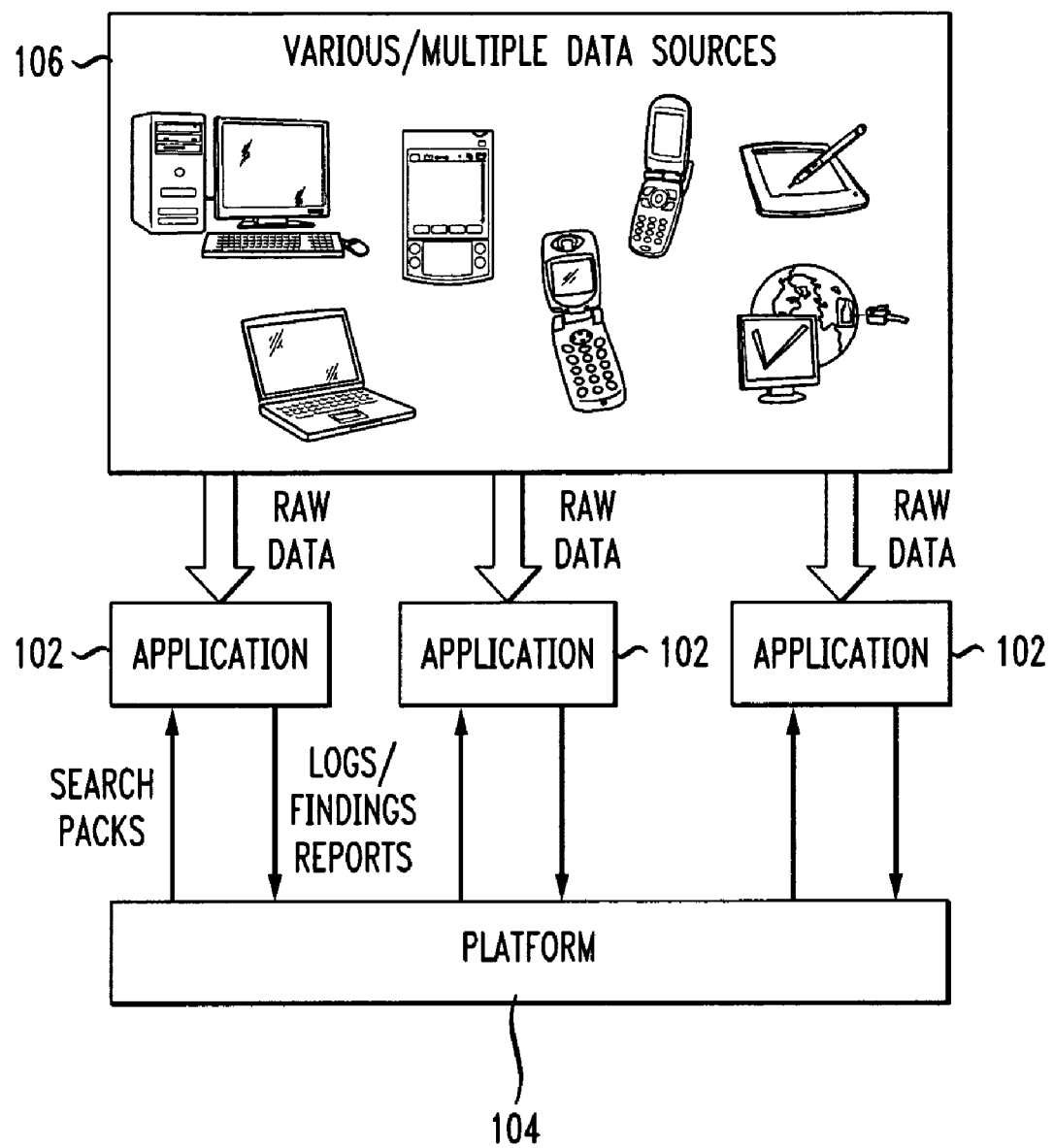
FIG. 1 is a block diagram showing the relationships among data sources, applications, and a platform in accordance with one embodiment of the present invention.

The platform, application and their interfaces are shown in FIG. 1. In a described embodiment of the present invention, the platform 104 and application 102 are used in a law enforcement and intelligence/counter-intelligence environment by law enforcement agencies (federal, state and local), intelligence agencies, Internet Service Providers ("ISP's"), portals, search engines, private investigation, and security firms conducting criminal investigations and intelligence data management. Illustrations of the present invention and its implementation are in the described embodiment criminal investigation and intelligence gathering. In another embodiment under similar technology, but different implementations, the present invention is used in corporate environments, public institutions, universities, or any other setting requiring an enterprise-wide solution for analysis of digital data by security experts involved in liability protection, and individuals involved with protection of proprietary intellectual property. The multiple various raw data sources 106 can be from any of the aforementioned environments and contexts.

In the described embodiment, the present invention involves novel software technology for digital forensics and data identification to handle (1) the extraction of digital data; (2) the storage of relevant digital data; (3) the analysis and identification of the digital data; (4) the management of the digital data; and (5) the cross-agency or cross-company sharing of digital data including images and videos.

In the present invention, the digital forensics and data identification application 102 is capable of identifying conclusive digital data coming from various digital sources. Conclusive data are any information decisive in whether to take further action. The identification of conclusive digital data is realized by comparing the input data with pre-established sets of relevant data and also by searching the input data for pre-defined patterns. The analysis is done automatically without human intervention. The application is able to compare multiple types of data, including text documents and multimedia files, with the pre-established sets. The application is also able to extract information from the input data in order to identify pre-defined patterns. The pre-established sets of relevant data and pre-defined patterns are encapsulated in search packs.

With respect to various data sources 106, primary physical devices typically analyzed are hard drives, network attached storage devices, and storage area network devices. Primary data sources include file systems, e-mail servers, databases, peer to peer network, or any other network protocols etc. Other physical devices include USB keys, portable hand-held devices, cell phones, PDA's, digital cameras etc.

The data identification platform 104 of the present invention is designed to manage the search packs. Platform 104 enables the creation and update of search packs, maintains a repository of search packs, imports and exports search packs so they can be exchanged with other platforms, and consolidates findings after retrieving information from the data identification applications.

In a criminal investigation environment the data identification application 102 in FIG. 1 can be used in the following ways: i) Directly on the suspect computer where the computer is booted with the application distributed on a CD-ROM to bypass the native operating system (which could have been compromised) and accesses directly the local hard drives; ii) From a single computer which has a suspect hard drive, suspect drive media, or drive image connected directly to it; or iii) From a network server which can access drives, or drive image, stored on network attached storage devices, or other equivalent storage devices; and configured virtual drives, or drive image, available on a Storage Attached Network (SAN).

Figure 2A:
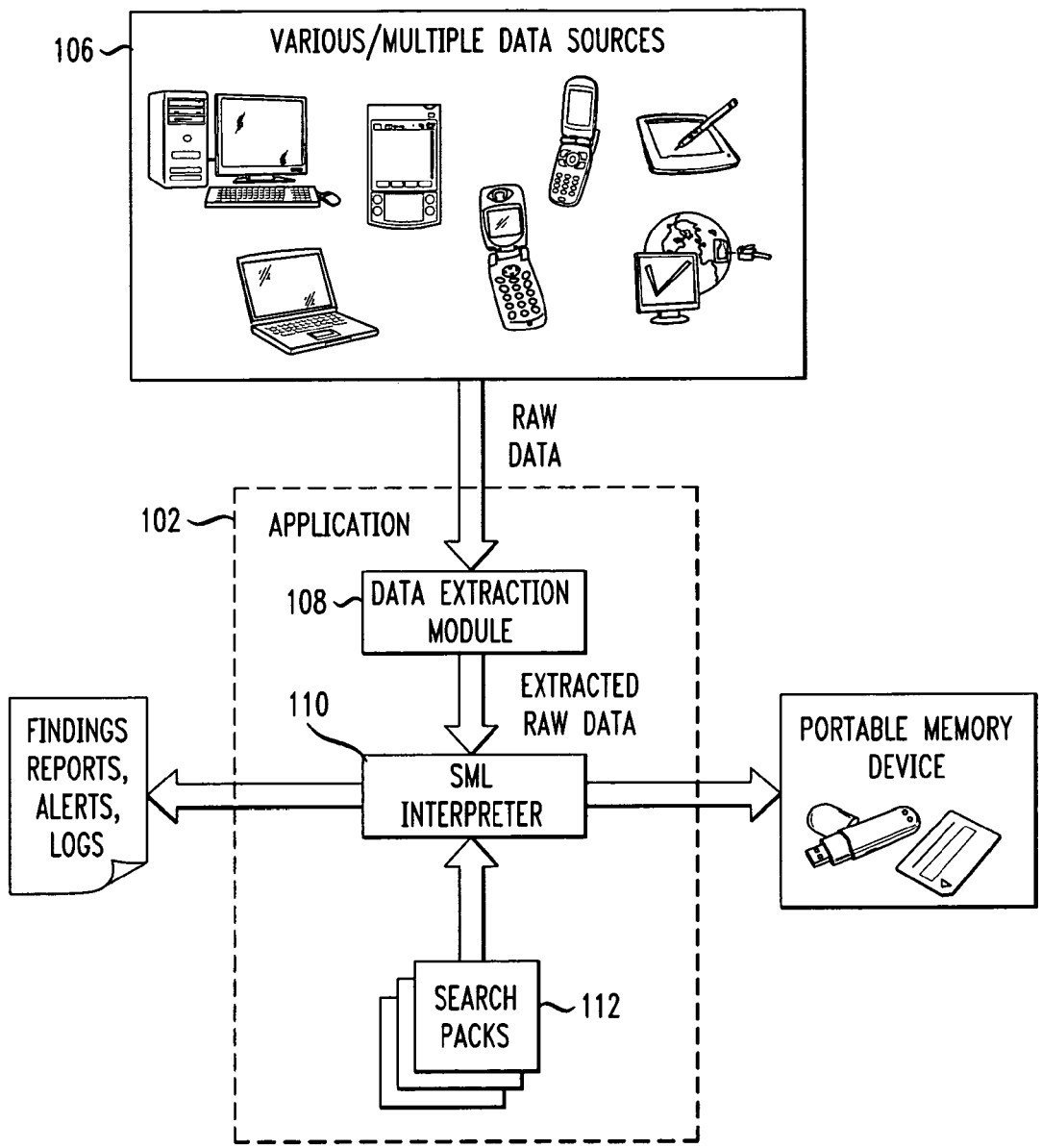
FIG. 2A is a block diagram showing in further detail digital forensic and data identification application 102 and its inputs and outputs in accordance with one embodiment of the present invention.

FIG. 2A is a block diagram showing in more detail digital forensic and data identification application 102 in accordance with one embodiment of the present invention. One input to application 102 is raw data from various data sources 106 such as a hard drive or drive image. These raw data are input to a data extraction module 108 of application 102.

Figure 3:
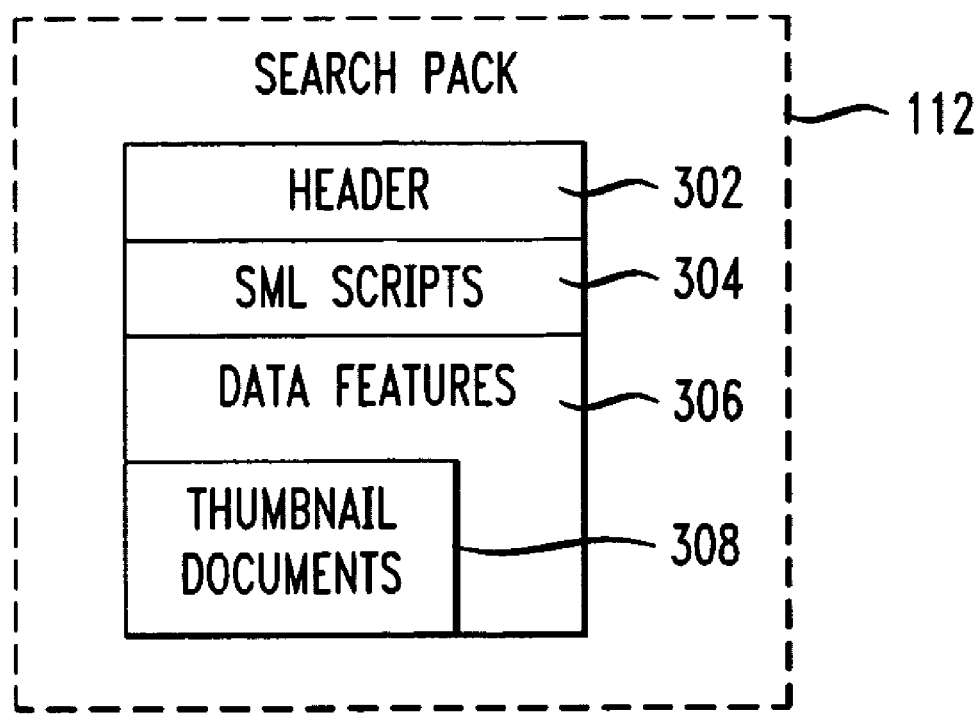
FIG. 3 is a block diagram showing components of a search pack in accordance with one embodiment of the present invention.

As shown in FIG. 1, one input to application 102 is one or more search packs 112 originating from platform 104. Search packs are discussed in detail with reference to FIG. 3. One component of a search pack is a search markup language or "SML" program. A SML interpreter 110 processes the extracted, unknown raw data according to the instructions in the SML 112 contained in the search packs as shown in FIG. 3. This process may include comparing the raw, unknown data against known data contained in a search pack. The output is one or more reports.

Application 102 can use multiple search packs 112 to perform data identification sequentially. Search packs do not have to come from a particular agency, they can be provided by any agency. Thus, during an investigation the data identification is performed not only with the agency's search packs but for the agent, concurrently and seamlessly with other agencies' search packs.

In the described embodiment application 102 generates a report detailing the findings of the data analysis and data identification. The reports and findings reference suspect files that triggered the match and a log. A report can be formatted in a manner most useful to the investigator or end user. Reports in their initial form are inadmissible in court as evidence. However, they can be verified by a qualified individual. For example, a chain of custody can be established and the report can be admissible as evidence in a criminal case. Initially, digital data that may be presented as evidence in court can be protected for data authenticity and integrity.

Figure 2B:
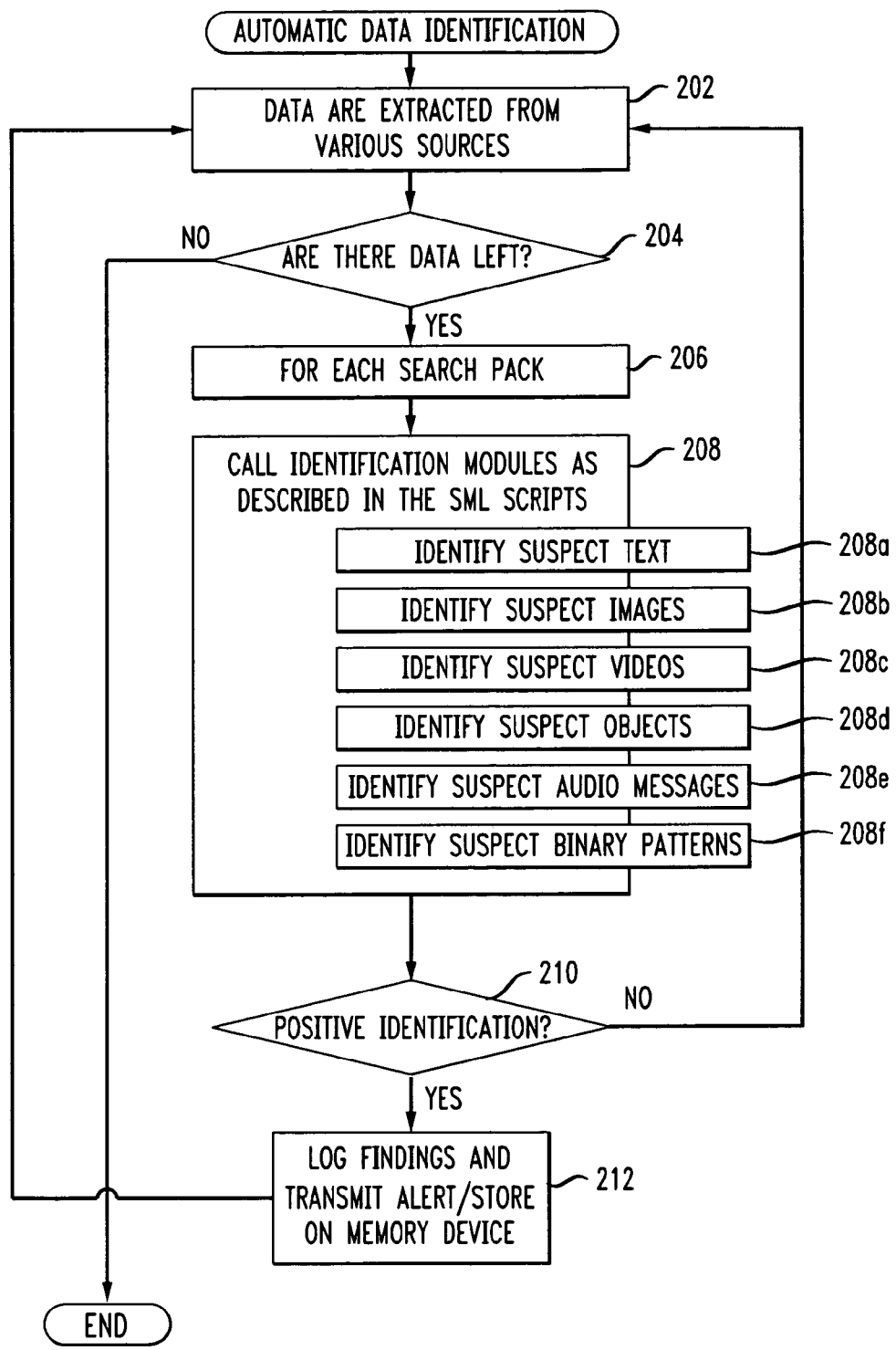
FIG. 2B is a flow diagram showing an automatic data identification process in accordance with one embodiment of the present invention.

The steps of an automatic data identification process of the present invention are shown in FIG. 2B. At step 202 data are extracted from raw data sources 106. As described above, these sources can vary widely and include any storage medium that can hold digital data. This extraction is performed using techniques known to one of ordinary skill in the field. At step 204 the application determines if there is any data to be extracted from any remaining data sources. If there is data left that needs to be identified, the process continues with step 206. If there is no data left, the process is complete.

Step 206 occurs for each search pack 112 in the application 102. For example, if there are ten search packs in an application, step 206 and all proceeding steps occur ten times concurrently. The concept and advantages of search packs and the reasons why there would be multiple search packs are described below with respect to FIG. 3. At step 208, each search pack 112 invokes its search markup language programs (described below) and calls the identification modules in those programs. This is performed in SML interpreter 110. At step 208, the following identification processes take place for the automatic identification of suspect data: identify suspect text 208a; identify suspect images 208b, identify suspect videos 208c, identify suspect objects 208d, identify suspect audio messages 208e, and identify suspect binary patterns 208f In other embodiments, additional identification modules can be invoked for various types of data not shown in FIG. 2B or in the other figures.

Each one of these modules is specialized in identifying a certain type of data. They all take the data extracted from data sources 106 and compute relevant features on these data and then compare these features to the ones contained in the data features portion 306 of search pack 112. In the described embodiment, features are quantitative characteristics of files having multimedia content computed or derived from the content of the files instead of the files binary structure. Depending on the type of identification needed, different features are extracted and compared. For example, in character recognition, features may include horizontal and vertical profiles, number of internal holes, stroke detection and many others. In another example, in speech recognition, features for recognizing phonemes can include noise ratios, length of sounds, relative power, filter matches and others. In the described embodiment, the ability to compare the content of multimedia files, whether visual or auditory, rely on the ability to extract these discriminating and independent features from the files. The extracted features are then compared with previously extracted features.

Returning to FIG. 2B, when one or more key features match, as determined by each identification module, the data are positively identified as suspect. If there is a positive identification at step 210, the findings are logged and an alert is transmitted at step 212 and control returns to step 202 where data are extracted from various sources. If there is no positive identification, control also returns to step 202. The process continues until there are no data left as determined at step 204.

In a described embodiment, the data extraction process, and SML interpreter execution described above, using the same data sources and search packs produce the same results regardless of the computing device. This is relevant to Federal Rule of Evidence 901(*b*)(9) which provides a presumption of authenticity to evidence generated by or resulting from a largely automated process or system that is shown to produce an accurate result. Furthermore, to satisfy the "Best Evidence Rule" and more specifically Evidence Rule 1001 (3), the reports also contain the context of any alerts and matches.

Application 102 can rapidly scan unknown input data. For images, application 102 can use a search pack to identify any images in the unknown data that may be illegal or conclusive. For example, if there is an image in the unknown data that matches or is visually similar to a known child exploitation photo, a known counterfeit currency note, or a known photo of a suspected terrorist, etc. As long as one of the search packs contains these known images, they will be identified in the unknown data. Any images, or, more generally, any data that matches or are similar are referred to as either suspect image/data or friendly image/data. The same is true for video and audio files. Unknown video and audio files can be partially matched against known videos or still images and audio files.

The present invention supplements conventional text-based searches and hash matching algorithms with semantic, hash-based technologies to automate a detection process for identifying known suspect files as well as identifying disparate relationships between known suspect files and other similar files.

In the described embodiment, an advanced analysis using digital forensic and data identification application 102 performs functions in addition to those in a standard analysis. These include extracting and comparing semantic information from the data files and disk areas of the inputted data source. More specifically, an advanced analysis involves: 1) using altered semantic hash functionality to automatically identify altered multimedia files; and 2) using series semantic hash functionality to automatically identify multimedia files that belong to a predefined series.

When application 102 is distributed on a CD-ROM and used directly on the suspect computer, it performs the following specific tasks:

Boot the suspect computer with a specialized operating system (thereby not relying on the installed operating system which could have been compromised), Compute checksums of the hard drives before and after the analysis to verify the non invasive analysis process, Log all input/output errors that might have occurred during data extraction and acquisition, Copy the identified suspect files and the findings report on a portable media drive (e.g. USB key).

When application 102 is used from a single computer which has a suspect hard drive, suspect drive media, or drive image connected directly to application 102 performs the following specific tasks:

Access the attached hard drive or hard drive image,

Compute checksums of the input media before and after the analysis to verify the non invasive analysis process, Copy the identified suspect files and the findings report on the examiner's computer.

When application 102 is deployed on servers which can access drives it has the following specific features:

It can be deployed on multiple servers in order to accommodate the input data increase, It can use resource intensive hash computation, It can accommodate more various input sources.

Among the numerous components of FIG. 1 and FIG. 2A is search pack 112, a software component that resides in platform 104 and application 102. FIG. 3 shows components of a search pack 112. In a described embodiment, search pack 112 contains a header 302, one or more SML script 304, and data features 306. In the criminal investigation and intelligence agency context, a search pack 112 is designed and prepared by an individual involved in a case and is created with an investigative goal in mind, for example, a passport investigation, tracking a child exploitation ring, gathering leads on a counterfeiting operation, and so on.

A search pack should: 1) be dedicated to a specific subject or case; 2) be as comprehensive as possible on the subject/case; and 3) be updated continuously as new intelligence or information about the case is learned. A search pack is essentially a digital snapshot of a case and contains all relevant data about a case.

In the context of an intelligence agency, such as the FBI, where users of the present invention will typically include agents, analysts, and examiners, search packs are created by agents to simplify and accelerate the examiner or agent's task in the field, e.g. at a crime scene or some other remote location, by automating the file analysis process.

As FIG. 3 shows, a search pack 112 has three basic sections: data features 306, SML scripts 304, and a header 302. Header 302 contains information such as contact information, confidentiality level, agent ID, and any other information needed to contact the person in charge of the search pack (e.g., the agent responsible for the case, a national expert on a specific subject, etc). Header section 302 of the search pack contains critical information used to identify the search pack, track modifications, detail access rights when sharing the search pack, and contains contact information. The contact information becomes very relevant when suspect data are identified while running another agency's search pack. In this situation the examiner performing the analysis can communicate with the other agency's contact to inform him/her of the situation.

SML script 304 makes it possible to describe complex searches that the search pack designer/creator wants performed on any incoming raw data. Search pack 112 can be specialized for a specific purpose. For example, a search pack can have the sole purpose of eliminating from incoming raw data any data that are "friendly," thus removing them from further investigation and saving time for an investigator. As described in more detail below, this can be done by including standard and semantic hash values of these friendly data, often contained in files (e.g., operating system files, application files) in a search pack. Data features 306 contains features extracted from known suspect files. These features can be hash values, as described above, when images or binary files are being compared. The features can also be document templates when text documents are matched or audio signatures when matching audio files. Another example of a specific purpose is detecting recurring patterns of illegal activities, such as activities stemming or resulting from a standard counterfeiting toolkit or a standard hacker toolkit. Other examples include:

- Detecting a specific context or situation (criminal, intelligence, etc.) with names, addresses, and pictures of places and people.
- Detecting general threats by containing pictures, blueprints and addresses of public buildings and structures that are potential terrorist targets.
- Comprehensive set of images on a precise subject (e.g. child exploitation).
- Detecting copyrighted material like movies or audio albums.
- Detecting file extension anomalies.
- Perform entropy test to identify encrypted files.
- Recognize the language of a textual document.

One sub-component of a search pack contains thumbnails of images or video 308 if the search pack creator decides to include them. With these original images an investigator can verify that a match is accurate. In the case of video, there can be one thumbnail for the whole video or one for each relevant frame.

A hash function is applied to all known data which includes text, images, and video. As is known to someone of ordinary skill in the field, there are numerous existing hash functions and new ones can be created. Existing ones include binary, altered semantic, and series semantic. New or future modules for hash functions may include, for example, hash functions for facial recognition. A hash value is a fingerprint or a digital signature of the content of a file and, therefore is derived from the content of a file. In the described embodiment, there are three different types of hash values or "signatures":

- Binary hash value is a unique cryptographic message digest value, like MD5 or SHA-1. It can be computed on any file type. It is used to determine if a file has been altered by comparing its hash value to the hash value of the original file.
- Altered semantic hash value is a proprietary hash type based on the semantic content of the file, not on its binary content. This hash works for textual documents, images, audio, and video files and makes it possible to detect altered versions of the same file.
- Series semantic hash value is a proprietary hash type also based on the semantic content of the file, not on its binary content. This hash works for textual documents, images, audio, and video files and make it possible to detect files that are part of a series.

In the described embodiment, a search pack can reference other search packs. This feature is useful to specialize a search pack without having to duplicate the entire content of the original search packs, and particularly their data sections. For example, a "counterfeit" search pack could be created based on the content of the "currency" and the "passport" search packs.

When creating a search pack, an investigator:

- Decides which known data and files are relevant to the investigative goal and should be in the search pack.
- Decides which hash value type or types should be created for each file (binary and or semantic), and if a multimedia file, whether a thumbnail or other visual should be included in the search pack.
- Decides what the search conditions for the investigative goal should be and create the SML script.
- Enter meta-data information e.g. contact information, security level, etc.

All content of a search pack can be modified to reflect changes in an investigation. Investigators, such as Examiners, Case Agents, and Field Agents, can download updates to search pack 112 directly from platform 104 as shown in FIG. 1. However, hash values cannot be edited directly; the underlying data or file must be modified. When a modification occurs, the version number of a search pack is updated. This is useful during synchronizations between the platform 104 and application 102. To avoid redundancy during search pack synchronization, downloads, and updating via CD, when a search pack is obsolete or no longer useful or is simply replaced or incorporated in another one, it can be removed from platform 104.

Search packs can be distributed by agencies to Internet service providers, portals and search engines, among other entities. These entities can utilize search packs to scan email exchanges and detect any known illegal data in these emails that match hash data sets in the search packs. In addition to emails, search packs can also be applied to images posted on dating sites, social networking sites, and community sites as these images may be relevant to crimes such as child exploitation, theft ID, and counter-intelligence.

Search pack 112 is an encapsulation of all the elements necessary for automatic digital forensic analysis and data mining in platform 104 and application 102 of the present invention. The principal strength of a search pack is that it does not contain directly readable or modifiable sensitive information but rather contains a safe representation (in the form of hash values) of sensitive information. This makes it possible to share search packs among agencies without risking a leak of critical information.

As described above, search conditions are programmed in SML, an XML-based language and contained in SML programs or scripts 304. In the described embodiment, an SML interpreter 110 executes the SML scripts contained in a search pack. More specifically, the SML interpreter 110 executes a series of SML instructions. SML allows an investigator to precisely describe conditions for identifying data that are useful or relevant to an investigation. Several examples of specialized search packs have been described above.

The "specialization" is often embodied in the SML script of a search pack. SML allows an investigator to describe very specific or specialized conditions and allows for a broad range of analysis. For example, an SML program can be written to only identify images that have a resolution of over 100 dpi. Other conditions on image properties (e.g. EXIF data or image file types) can also be applied to further refine a condition, such as image properties, hash sets, occurrences of words and phrases, and so on. Specific SML phrases can be grouped together by logical operators (AND, OR) making it possible to build complex conditions. It should also be noted that a condition may not involve a hash. To illustrate, take the following search criteria:

"If the submitted file is an image that has a resolution over 300 dpi, where the AUTHOR EXIF field contains information and matches with at least one video of this search pack then trigger an alert"

The SML for this search may be:

```
<condition id="cond1">
    <file-prop type="image"/>
    <img-prop res="300" op="gt"/>
    <img-mdata field="author" value="*"/>
    <ash-match group-id="videos"/>
</condition>
```

In the described embodiment of the present invention, SML interpreter 110 is able to interact with other modules for completing specific tasks. Examples include: an optical character recognition (OCR) module which accepts video files and returns words or phrases extracted from the video; hash indexers (e.g., binary hash indexer, semantic hash indexer) which accepts files and returns hash values; and hash comparators which compares hash values. Search packs together with other technologies of the present invention are expandable to integrate external third-party technologies and software, such as OCR technologies.

As shown in FIG. 1 a digital forensics and data identification platform 104 operates with one or more digital forensics and data identification applications 102. Platform 104 can be seen as a server application and application 102 is a client application. These two aspects of the present invention have a complimentary relationship, and both utilize search pack and SML, although in somewhat different capacities. In the context of a criminal investigation and intelligence gathering organization, such as the FBI or Secret Service, platform 104 is intended to be used by investigators and, in addition, is accessible and supervised by information technology (IT) staff. With respect to the investigators, those who work in a setting such as a regional or home office and use computers that are connected to a network would use digital platform 104 while those on the field or in remote locations investigating a case or gathering intelligence would use digital application 102 in a portable CD-ROM format or on portable computers. For analysis of large volumes of data, the network server application can be used.

Figure 4:
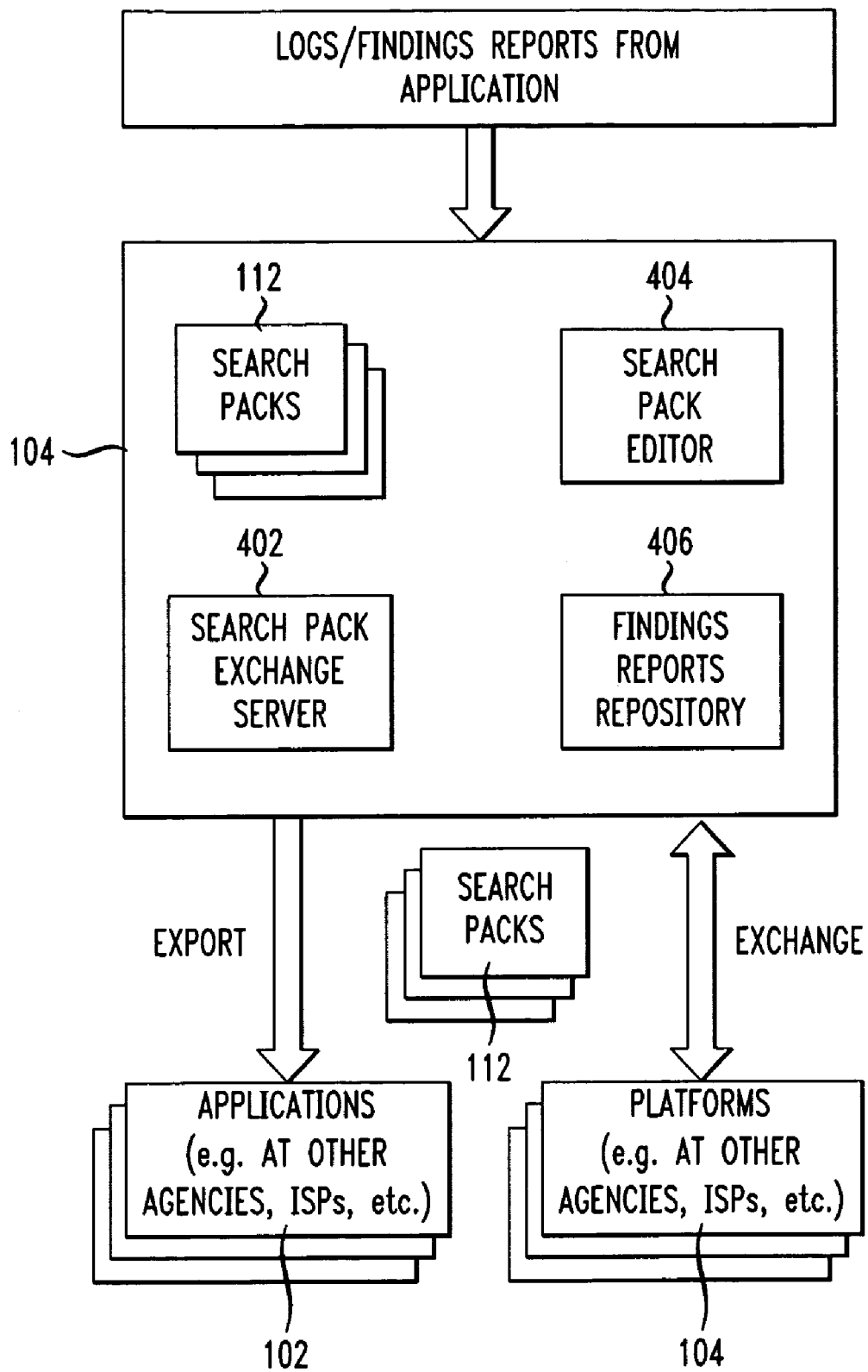
FIG. 4 is a block diagram showing in further detail a digital forensic and data identification platform and its inputs and outputs in accordance with one embodiment of the present invention.

FIG. 4 is a block diagram showing a data identification platform 104. Platform 104 is intended to be used by investigators responsible for storing, categorizing, and disseminating search packs 112. Platform 104 hosts search packs and can import and export search packs from other platforms or applications using search pack exchange server 402. It also manages and catalogs search packs. A search pack editor 404 coordinates the creation and editing of search packs. Platform 104 also manages the use of them among investigators thereby facilitating the exchange of information between agencies, as well as centralizing reports and findings, and consolidating investigation logs. Investigation logs from application 102 can be uploaded to platform 104 to allow the investigators to review the consolidated logs.

As the number of search packs grows platform 104 offers more functionalities to search through them based on their content. It is also possible to update multiple search packs in a single operation. Another management feature is the ability to compare two search packs to determine how similar they are to avoid duplication and facilitate management. Comparing two search packs is possible even if they have been created by a different platform as the comparison is done on their data, without the need to access the original files. Similar search packs may also imply that different agencies may be working on the same cases.

In a described embodiment, a single entity, such as a government agency or a sub-division of an agency typically will have installed a single digital forensics and data identification platform 104 as shown in FIGS. 1 and 4 for use only within that agency, group, sub-division, etc. In the described embodiment, there is cross-platform sharing among agencies or entities, each running its own copy or version of platform 104. This allows an agency or enterprise to decide which of its data it wants to share with other entities, thus allowing data sharing without compromising intra-agency confidentiality requirements. In another embodiment an agency or other entity can use multiple digital forensic platforms 104 in its IT environment. In another embodiment, regional or other agencies do not have to install platform 104 in order to execute a search pack 112 on an application 102.

One of the primary functions of platform 104 is allowing the creation and editing of search packs using search pack editor 404. For example, in the FBI, an Analyst or Examiner would normally create, update, or delete a search pack based on the initiation or progress of an investigation. This can be done on the platform and then disseminated to Field or Case Agents who are using search packs on digital forensic and data identification application 104.

With respect to data sharing, platform 104 supports the exchange of search packs among entities, for example, via CD or search pack downloads. Given that search packs contain not only known data in the form of text, video, images, etc., but also strategic search conditions encoded in SML (recall that search packs are created with an investigative goal in mind), entities can share this strategic information and perspective about cases as well.

Search pack distribution is controlled by allowing application 102 to download and decrypt only those search packs belonging to platform 104 associated with the application. A platform 1 can import a search pack from platform 2, at which point the search pack also belongs to platform 1 for the purposes of search pack distribution control (it still belongs to platform 2). This distribution control mechanism is enforced in two steps: 1) when the application connects to the platform, the application has to provide the correct credential to the platform before being able to download a search pack from the platform (this prevents an application from Agency A to connect to a platform from Agency B); and 2) once a search pack is downloaded, the application must share the same cryptographic key with the platform in order to decrypt the search pack.

When application 102 is transferring user activity logs, which may contain sensitive, analyzed data to platform 104, a network connection, such as a VPN, is established to ensure privacy. Search packs are encrypted when stored on the platform and decrypted only when they need to be modified.

The application 102 and the platform 104 authenticate users and log their activities. In the described embodiment, platform 104 has an internal mechanism that authenticates users manipulating search packs (for creation, update, import, export). In the described embodiment, a user is not authenticated with the application. In one embodiment where the Microsoft Windows operating system is used, the application uses a Windows login program to log the user's activity and to establish connections with the platform.

The platform has a user interface for creating, editing and importing/exporting search packs. The platform has a Web based user interface that allows users to utilize a platform's functionality. An investigator can create a search pack, edit SML, generate hash values, enter meta-data such as general information, contact information, thumbnails, etc. via an application interface and a platform interface. For example, when generating hash values, the investigator can select and places files via the interface for which hash values are needed (text, image or video files) in a folder and select which type of hash functions should be performed on which files.

In the described embodiment, all users' activities are logged by application 102 or by platform 104. These activities include: login information; data acquisition; automatic searches performed and important results found; report activity; manipulation of files; and any error encountered by the application.

Pervasive throughout the platform and application is the manipulation of sensitive data. Data are secured at each stage of data creation, modification, transfer/exchange, and storage. The platform also authenticates users and logs activity. When a search pack is disseminated to investigators within an agency or to other agencies, a search pack satisfies the following security requirements: 1) confidentiality: ensuring that search pack content cannot be accessed by unauthorized people, this is achieved by encrypting the content; 2) integrity: ensuring that the content has not been modified without making an activity log entry which is achieved by integrating a checksum; and 3) authenticity: ensuring that the creator of a search pack can be authenticated, this is achieved by integrating digital signatures.

Platform 104 and application 102 create numerous files, each containing critical information that needs to be protected against external modifications. In the described embodiment, the files contain encrypted checksums thereby ensuring their integrity. Investigators and other end users also create several categories of files containing sensitive data (log files, case files, hard-drive images, etc.) that are protected against external modifications. In one embodiment, this is done by using encrypted checksums in the files. Any modifications of those files occurring within the application are logged thereby guaranteeing the files' integrity.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

Embodiments can include a computer-readable storage medium upon which is embodied and stored a sequence of programmed instructions that, when executed by a processor, cause the processor to perform functions as described herein.

We claim:

1. A computer-readable storage medium upon which is embodied and stored a sequence of programmed instructions that, when executed by a processor, cause the processor to perform functions comprising:
   extracting information from input data;
   detecting suspect data contained in said extracted data using a forensic search tool of a computing platform associated with a first agency, said detecting performed by matching said extracted data with one or more pre-defined data patterns specified by said forensic search tool, wherein said suspect data comprises data identified by said forensic search tool as being associated with inappropriate or illegal activities;
   including the suspect data and a non-readable and non-modifiable representation of sensitive data in the forensic search tool;
   outputting a report identifying said suspect data; and
   outputting said forensic search tool by said computing platform associated with said first agency to at least one computing platform associated with a second agency,
   wherein the instructions associated with said digital forensic search tool further comprise
   a header;
   a search markup language portion;
   a data features portion containing features of data,
   wherein the digital forensic search tool enables said computing platform associated with said first agency to share the suspect data with said at least one computing platform associated with a second agency in a manner that enables utilization of the suspect data by the second agency while not revealing the actual content of the sensitive data to the second agency; and
   wherein instructions implementing said digital forensic search tool are provided in accordance with a search markup language.

2. The computer-readable storage medium as recited in claim 1, further comprising a data verification portion containing a plurality of actual data representations for identifying potential suspect data.

3. The computer-readable storage medium as recited in claim 1, wherein the features of data cannot be directly modified by the second agency.

4. The computer-readable storage medium as recited in claim 1, wherein the search markup language portion and the data features portion enable the first agency to share an investigative strategy for a particular case with the second agency.

5. The computer-readable storage medium as recited in claim 1, wherein the features of data cannot be used to recreate the sensitive data.

6. The computer-readable storage medium as recited in claim 1, further comprising:
   collecting said input data.

7. The computer-readable storage medium as recited in claim 1, further comprising:
   modifying content of said forensic search tool to change said pre-defined data patterns specified by said forensic search tool.

8. A digital forensic analysis method, comprising:
   extracting information from input data;
   detecting suspect data contained in said extracted data using a forensic search tool of a computing platform associated with a first agency, said detecting performed by matching said extracted data with one or more pre-defined data patterns specified by said forensic search tool, wherein said suspect data comprises data identified by said forensic search tool as being associated with inappropriate or illegal activities;
   including the suspect data and a non-readable and non-modifiable representation of sensitive data in the forensic search tool;
   outputting a report identifying said suspect data; and
   outputting said forensic search tool by said computing platform associated with said first agency to at least one computing platform associated with a second agency,
   wherein the digital forensic search tool comprises
   a header;
   a search markup language portion;
   a data features portion containing features of data,
   wherein the digital forensic search tool enables said computing platform associated with said first agency to share the suspect data with said at least one computing platform associated with said second agency in a manner that enables utilization of the suspect data by the second agency while not revealing the actual content of the sensitive data to the second agency, and
   wherein said forensic search tool is implemented using said search markup language to permit sharing of said forensic search tool by said computing platform associated with the first agency with said at least one computing platform associated with the second agency.

9. The digital forensic analysis method of claim 8, further comprising:
   storing said report in a reports repository,
   said report including forensic analysis findings.

10. The digital forensic analysis method of claim 8, wherein said suspect data is conclusive data.

11. The digital forensic analysis method of claim 8, wherein said detecting suspect data further comprises:

serially searching said extracted data using a plurality of said forensic search tools.

12. The digital forensic analysis method of claim 8, wherein said detecting suspect data further comprises identifying suspect text, images, videos, objects, audio messages, and binary patterns.

13. The digital forensic analysis method of claim 8, further comprising:

outputting an alert upon occurrence of a match between said extracted data and one of said pre-defined data patterns specified by said forensic search tool; and logging all user activities.

14. The digital forensic analysis method of claim 8, wherein said detecting suspect data uses a semantic hash function.

15. The digital forensic analysis method of claim 8, further comprising:

booting a suspect computer with a specialized operating system;

computing one or more checksums to verify a before analysis state and an after analysis state of a memory device of said suspect computer; and copying files identified to include said detected suspect data and a findings report onto a removable storage medium.

16. The digital forensic analysis method of claim 8, further comprising:

collecting said input data.

17. The digital forensic analysis method of claim 8, further comprising:

modifying content of said forensic search tool to change said pre-defined data patterns specified by said forensic search tool.

18. The digital forensic analysis method of claim 8, further comprising:

representing sensitive data using a digital fingerprint to prevent disclosure of said sensitive data to said at least one computing platform associated with a second agency.

19. The digital forensic analysis method of claim 18, wherein said digital fingerprint is provided using a cryptographic one-way hash function.

20. The digital forensic analysis method of claim 8, further comprising:

editing said forensic search tool based on at least one of an investigative strategy and an investigative goal.

21. The digital forensic analysis method of claim 20, wherein said editing said forensic search tool further comprises:

creating said forensic search tool using said search markup language.

22. The digital forensic analysis method of claim 8, further comprising:

computing said features of data based on said extracted data, wherein said detecting suspect data further comprises matching said computed features of data with said extracted data.

23. The digital forensic analysis method of claim 22, wherein the computed features of data comprise speech recognition features.

* * * * *